United States Patent [19]

Kramer

[11] 4,344,806

[45] Aug. 17, 1982

[54] METHOD OF MAKING A BEARING

[75] Inventor: James H. Kramer, Akron, Ohio

[73] Assignee: The B. F. Goodrich Company, New York, N.Y.

[21] Appl. No.: 246,561

[22] Filed: Mar. 23, 1981

[51] Int. Cl.³ .................. B29C 25/00; B29H 7/00; B65H 81/00
[52] U.S. Cl. .................................. 156/154; 156/138; 156/185; 156/187; 156/192; 156/194; 156/217; 156/218; 156/245; 156/297; 156/307.1
[58] Field of Search ............... 156/137, 138, 140, 141, 156/154, 184, 185, 187, 191, 192, 194, 217, 218, 245, 297, 307.1

[56] References Cited

U.S. PATENT DOCUMENTS

| 1,911,532 | 5/1933 | Roderwald | 156/194 |
| 3,473,989 | 10/1969 | Richmond | 156/140 |
| 3,564,933 | 2/1971 | Clinkenbeard | 156/138 |
| 3,645,829 | 2/1972 | Palfreyman et al. | 156/575 |
| 3,673,025 | 6/1972 | Fukuyama et al. | 156/154 |
| 3,673,883 | 7/1972 | Adams | 156/140 |

Primary Examiner—Michael G. Wityshyn
Attorney, Agent, or Firm—Joseph Januszkiewicz

[57] ABSTRACT

The method of making a non-metallic bearing assembly by initially molding the inner portion of the bearing as a flat longitudinally extending strip having a plurality of spaced abutments. The flat strip is then rolled into a hoop and then wound with fabric as such fabric is impregnated with epoxy resin.

9 Claims, 5 Drawing Figures

METHOD OF MAKING A BEARING

BACKGROUND OF THE INVENTION

This invention relates to a bearing assembly and more particularly to elastomeric journal bearing assemblies which are adapted for marine propeller shafts. Elastomeric journal bearings have been found to be particularly suited for this purpose because of their exceptional ability to withstand the effects of corrosive fluids and to abrasion resulting from bits of foreign materials which are carried in suspension in the sea water or other liquids in which the shaft and journal bearing assembly operates. Such elastomeric journal bearing assemblies have been made and are still being made with rigid metallic non-corrosive support members but the materials are more expensive and the manufacturing costs are higher. A further advantage of the elastomeric journal bearings is that since they operate in a liquid medium they are self lubricated and therefore highly desirable for marine use as for the stern propeller shaft journals.

The present invention provides a novel method for making a new and improved elastomeric journal bearing utilizing a novel outer shell and inner shell wherein the integral assembly provides a plurality of circumferentially spaced radially inwardly extending projections that provides support for the shaft and a plurality of water wedges for lubricating purpose rather have the plural supports operate as squeeges which would wipe the lubricant off. The method employs a flat molding process that is combined with a winding process whereby a fiberglass reinforced rubber or elastomeric shell is further supported by a fiberglass reinforced plastic which provides a rigid outer housing for the inner flexible spaced supports. A unique advantage of the outer shell being fabricated from a fiberglass reinforced plastic made from an epoxy resin is that it permits the machining of the outer surface to a precise diameter and in the event that an error has been made in the dimensions of the outer surface, additional layers of fiberglass reinforced plastic can be molded back onto the outer shell by a simple winding process to increase it's dimensions to any desired size and thereafter store the assembly or machine the journal bearing assembly to a new dimension. This process is simple and can provide means for accurately sizing the outer diameter without the use of expensive molding processes. This process also permits the manufacture of numerous oversize journal bearing assemblies, storage of these asemblies and then machining of the assemblies to the precise dimension when needed. The materials used for the outer shell which is to be machined is an inexpensive rigid fiberglass reinforced plastic and of extreme importance is the fact that the bearing assembly will not swell and present start up problems inherent in other bearing assemblies.

SUMMARY OF THE INVENTION

The present invention is directed to a new and improved process for fabricating an elastomeric bearing with a rigid non-metallic outer shell by initially fabricating a flat longitudinally extending support member that has spaced rubber strips with flat faces, thence wrapping such support member with the spaced strips into an annular shell. The shell is then wrapped with a fiberglass sheet that is impregnated with an epoxy resin to complete the elastomeric journal bearing assembly.

DETAILED DESCRIPTION

Figure 1:
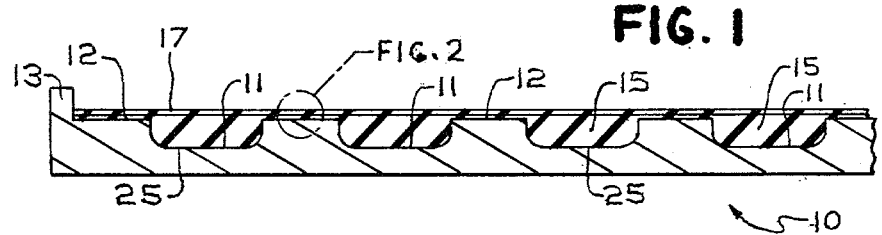
FIG. 1 is a side elevational view partly in cross section of a mold showing the first step of fabricating of an elastomeric journal bearing assembly.
Figure 2:
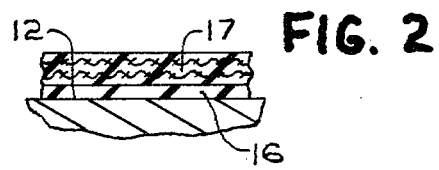
FIG. 2 is a greatly enlarged fragmentary side elevational view of a portion of the flat sheet shown in FIG. 1.

Referring to the drawings, wherein like reference numerals designate like or corresponding parts throughout the several views, there is shown in FIG. 1 a mold 10 having a plurality of longitudinally extending cavities 11 that are u-shaped in cross section. The upper edges of the respective adjacent cavities are interconnected by planar surfaces 12 that lie in a common plane. The mold 10 has side walls 13 and a suitable cover with old and well-known means for curing the product within the mold 10.

A plurality of elastomeric or rubber strips of natural rubber 15 are placed in the cavities 11 such that their upper surfaces are substantially flush with the planar surfaces 12. The respective bottom surfaces of the cavities are co-planar such that upon vulcanization of the product the respective lower surfaces lie in a common plane.

The elastomeric material of which the respective strips 15 are made is a suitable natural, synthetic rubber or a rubber having a combination of these materials that can be vulcanized to exhibit a low coefficient of friction when lubricated with water. The elastomeric material should have adequate resiliency, strength and sufficient heat resistance to withstand a temporary absence of lubricating liquids as at start-up. As an example of acceptable elastomers for use as strips 15 are conventional nitrile rubber compositions, particularly rubber compositions comprising polymers of butadiene and acrylonitrile where butadiene is the major component of the polymer. Natural and other synthetic rubber compositions are available for such use provided they have the properties discussed above. A sheet or sheets of elastomeric material such as nitrile rubbers such as polymers of butadiene and acrylonitrile 16 is then placed in the mold flush with the planar surfaces 12 and the top surfaces of the respective strips 15. A fiberglass fabric reinforced rubber sheet or sheets 17 are then placed over the sheet or sheets of elastomeric material to form a thin layer or film of fiberglass reinforced rubber (FRR) which upon vulcanization will become intergal with the sheet of elastomeric material and the strips 15.

The fiberglass fabric covered with rubber is the preferred form of the invention although other fabrics may be used to provide a multi-layered laminate such that the cords of the fabric are reinforced with elastomeric materials. The term cords includes cords, strands and similar materials. The fiberglass cords are particularly suitable as a material since it will not corrode or shrink.

Further, these cords will not absorb water or fluids. Such fiberglass fabric is reinforced with a copolymer of butadiene and acrylonitrile rubber cement as by dipping, spraying or by brushing into and on, and then allowed to dry to provide the resilient layer composed of fiberglass impregnated with rubber. The number of sheets of fiberglass impregnated layer 17 applied to the flat sheet being formed is determined by the strength desired. Curing is then effected in a conventional manner whereby the mold and product is subjected to a temperature of approximately 177° C. for about one hour. After vulcanization a flat sheet of FRR is formed with the laterally spaced strips 15 bonded thereto.

Figure 4:
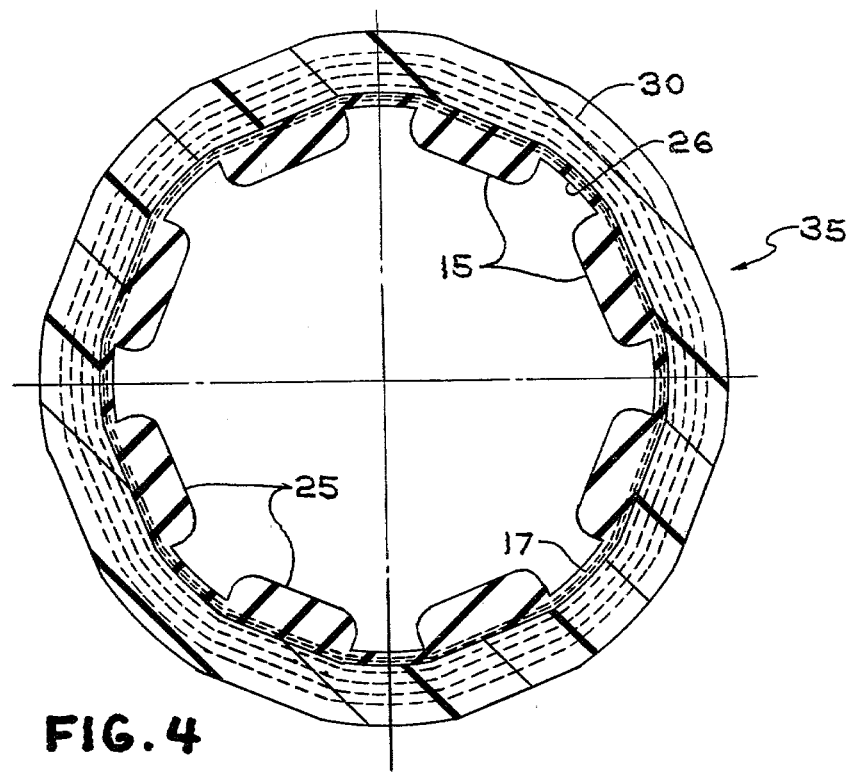
FIG. 4 is side elevational view in cross section of a cured elastomeric journal bearing assembly after removal from a mandrel.
Figure 5:
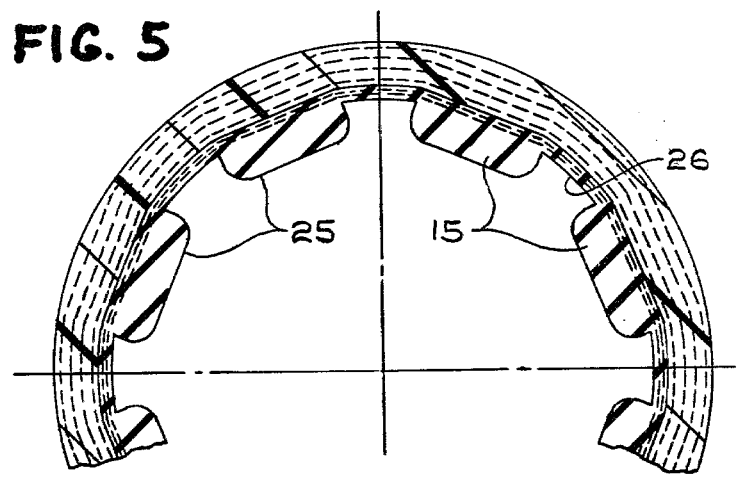
FIG. 5 is a side elevational view in cross section of a portion of a machined elastomeric journal bearing assembly.

The flat sheet 17 of FRR with the spaced rubber strips 15 is then rolled in a circumferential hoop around a mandrel 20. Mandrel 20 is a roll having a shaft 21 suitably powered by means not shown but old and well-known in the art. The outer periphery of mandrel 20 has a plurality of planar surfaces 22 forming a polygonal mandrel. The number of flat outer surfaces is determined by the number of strips desired as well as by the diameter of the final finished product. The flat sheet 17 is wrapped around mandrel 20 such that the respective strips of rubber 15 have their respective flat surfaces 25 abutting the respective flat planar surfaces 22 with the recess 26 between adjacent strips of rubber 15 bridging the apex of adjacent flat planar surfaces 22. A woven fabric of fiberglass 30 is then wound onto the outer periphery of the circumferential hoop that is positioned over mandrel 20. As the fiberglass 30 is wound thereon, the fabric is coated with an epoxy resin from a reservoir 31 with the aid of a doctor blade 32. The epoxy resin can be applied manually or by any known mechanical means. The number of layers of impregnated fiberglass fabric 30 that is applied around the outer surface of the circumferential hoop is determined by the desired size needed for a specific application. It is to be noted, that the finished product after the winding and the setting of the epoxy resin is not a true outer circle but rather is a polygonal shaped bearing unit 35 (FIG. 4).

A specific example of the epoxy resin useful in the present invention is one by the tradename "APCO" available from Applied Plastics Co., Inc. of 612 Franklin Avenue, El Segundo, Calif. 90245. The epoxy resin has a specific gravity of 1.165 and its accompanying curing agent or hardener has a specific gravity of 1.809. The epoxy resin has a Shore D 25° C. hardness of 84 with a glass transition temperature of 196° F. The viscosity of the epoxy resin is 2000 cps (1800±300); while the viscosity of the hardener is 410 cps (310±200). Another epoxy resin that can be used is one known as "Everfix Epoxy Resin" having a density of 8.5 lbs. per gallon. The hardener used with such epoxy resin is a modified alaphatic amine adduct available through Fibre Glass-Evercoat Co. Inc., 6600 Cornell Road, Cincinnati, Ohio 45242.

Figure 3:
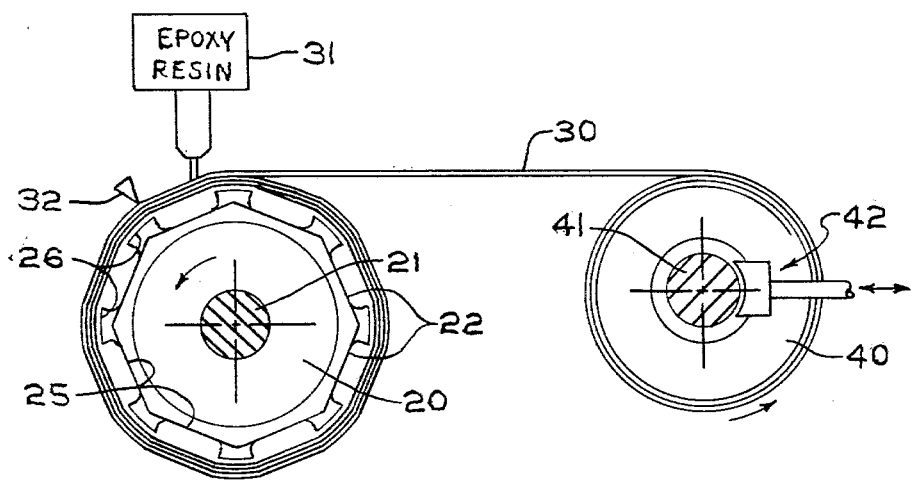
FIG. 3 is a schematic side elevational view, partly in section, depicting the wrapping of fiberglass fabric onto a fiberglass reinforced rubber inner shell while impregnating the wrapping with epoxy resin.

The fiberglass fabric 30 is supplied from a storage roll 40 supported on an axle or shaft 41 driven in synchronism with shaft 21. A brake mechanism 42 is shown in FIG. 3 as cooperative with shaft 41 to facilitate the winding operation. To effect the curing of the bearing unit 35, the mandrel is slowly rotated until cure of the epoxy resin is effected. The outer shell of the bearing unit 35 comprising the wound fiberglass fabric 30 impregnated with the epoxy resin is referred to as the FRP shell or outer shell wherein the FRP refers to fiberglass reinforced plastic surrounding the inner shell of FRR.

After the bearing unit 35 has hardened, the unit 35 is removed from the mandrel 20 and machined to a desired round dimension. In the event that the bearing unit 35 has been machined to a lesser dimension than desired, additional epoxy impregnated fabric 30 is wound onto the bearing and after such epoxy resin has hardened the bearing unit 35 is machined to its desired dimension.

Thus the method of fabricating a journal bearing 35 as described above is considerably more efficient and cost effective when compared to those presently available. This is particularly the case in the larger size bearings where it is inexpensive to make a flat sheet of fiberglass reinforced rubber adhered to a plurality of laterally spaced elastomeric strips as compared to the initial molding of a circumferential hoop or annular bearing unit.

Various modifications are contemplated and may be resorted to by those skilled in the art without departing from the described invention, as hereinafter defined by the appended claims, as only a preferred embodiment thereof has been disclosed.

I claim:

1. A method of fabricating a bearing assembly comprising the steps of building a flat rectangular sheet of plies of fabric reinforced with an elastomer; abutting a plurality of strips of elastomer in a laterally spaced relationship to said flat sheet; vulcanizing said strips and said flat sheet into an integral unit; wrapping said flat sheet into a circumferential hoop around a mandrel with the laterally spaced strips on the inner periphery and abutting said mandrel in a circumferentially spaced relationship; simultaneously rotating said mandrel while wrapping a fiber fabric onto the outer circumference of said hoop and impregnating the fiber fabric with a plastic resin; and curing said resin to complete a fiber reinforced outer shell to provide a bearing assembly.

2. A method of fabricating a bearing assembly as set forth in claim 1 wherein said completed bearing assembly is machined to a predetermined diameter.

3. A method of fabricating a bearing assembly as set forth in claim 1 wherein the outer dimension of said completed bearing assembly is sized to a finished diameter.

4. A method of fabricating a bearing assembly as set forth in claim 3 wherein said strips of elastomer in the vulcanizing process have all of their outer surfaces that are remote from contact with said flat sheet in a flat coplanar relationship.

5. A method of fabricating a bearing as set in claim 4 wherein the linear distance between the respective strips is greater than one half the distance from one side edge of a strip to the other side edge of said strip.

6. A method of fabricating a bearing assembly comprising the steps of positioning a plurality of elastomeric strips into a mold having parallel cavities separated by abutments, forming a thin flat planar sheet of fabric reinforced elastomer across the mold having positions of said thin sheet abuttingly contacting all of said elastomeric strips, vulcanizing said strips to said flat planar sheet of fabric reinforced elastomer to form a first layer, forming a circumferential hoop from said first layer by overlapping the ends of said thin sheet, wrapping a fabric onto said hoop while impregnating said wrapped fabric with a plastic resin to form an outer shell on said hoop, and curing said resin to form an annular bearing assembly.

7. A method of fabricating a bearing assembly as set forth in claim 6 wherein said hoop is formed on a mandrel having a plurality of flat surfaces.

8. A method of fabricating a bearing assembly as set forth in claim 6 wherein said circumferential hoop is formed on a polygonal mandrel whose outer surface have equal planar surfaces upon which said elastomeric strips abuttingly engage.

9. A method of fabricating a bearing assembly as set forth in claim 8 wherein said cured annular bearing assembly has an outer circumferentially extending polygonal, and said outer shell is machined to a cylinder with a predetermined diameter.

* * * * *